Patented Aug. 18, 1925.

1,550,395

UNITED STATES PATENT OFFICE.

CARL SCHANTZ, OF FREIBURG, BADEN, GERMANY, ASSIGNOR TO GEBR. HIMMELSBACH AKTIENGESELLSCHAFT, OF FREIBURG, BADEN, GERMANY.

PROCESS OF PREPARING WOOD, CELLULOSE, AND OTHER SUBSTANCES FOR THE ABSORPTION OF PRESERVATIVES OR COLORING MATTER.

No Drawing.     Application filed July 16, 1924. Serial No. 726,409.

*To all whom it may concern:*

Be it known that I, CARL SCHANTZ, a citizen of the German Republic, residing at Freiburg, Baden, Germany, have invented a certain new and useful Process of Preparing Wood, Cellulose, and Other Substances for the Absorption of Preservatives or Coloring Matter, of which the following is a specification.

Substances such as wood and cellulose, which swell under the action of moisture, are nevertheless difficult to treat effectively by absorption, with preservatives and coloring matter. This is more particularly the case if the preservative or coloring matter is astringent or tends to reduce the capacity of the substance to swell, as is the case with caustic preservatives. The most effective absorption is obtained, when the substance treated is distended to the fullest possible extent. For this purpose it is common to treat the substance with steam, but to do this effectively requires a comparatively long time, and the substance is then liable to deteriorate under the action of the steam.

According to my invention the duration of the treatment is much shortened, without deleterious effects on the substance treated, by using for the process a homologue of phenol, together with steam or vapor of some volatile organic substance, for example, a hydrocarbon, or alcohol, or tetrachloride of carbon. By this means the period of treatment may be reduced to about one third of the time which is required when pure steam is used, and the temperature used may be reduced to about two thirds. Only a small percentage of the phenol homologue, which may be one of the cresols need be added to the steam, the action thereof being, apparently, catalytic.

Wood, for example, may be treated at a temperature below 100° C. 0.5 to 2 kg. of cresol being used per cubic meter of wood. The duration of the treatment may vary from, say, 6 to 18 hours, according to the nature of the wood.

When well distended by this treatment the wood is ready for being preserved or colored by one of the well-known processes.

What I claim as my invention and desire to secure by Letters Patent of the United States is:—

1. The process of preparing substances, which are capable of being distended by moisture, for absorption of preservatives or coloring matter, consisting in treating such substances with vapor containing an admixture of a homologue of phenol.

2. The process of preparing substances, which are capable of being distended by moisture, for absorption of preservatives or coloring matter, consisting in treating such substances with vapor of a volatile organic substance having an admixture of a homologue of phenol.

In witness whereof I have signed this specification.

DR. CARL SCHANTZ.